United States Patent Office 3,072,634
Patented Jan. 8, 1963

---

3,072,634
ORGANIC ISOCYANATE-LIGNIN REACTION
PRODUCTS AND PROCESS
Thomas R. Santelli and Robert T. Wallace, Toledo, Ohio, assignors to Owens-Illinois Glass Company, a corporation of Ohio
No Drawing. Filed Dec. 16, 1960, Ser. No. 76,108
9 Claims. (Cl. 260—124)

This invention relates to new compositions of matter and to methods for preparing the same. More particularly, this invention relates to reaction products of lignin with organic monoisocyanates and to methods for their preparation.

This application is a continuation-in-part of Serial Number 846,822, filed October 16, 1959.

The reactivity of an organic isocyanate with various compounds to form polyurethanes is well known. For example, organic diisocyanates are known to react with compounds such as polyesters, polyethers, polyphenols, glycols and the like to form resinous products of varying consistency.

In these prior processes the starting materials such as the polyesters, polyethers, etc., are liquids and are thus easily reactable with the diisocyanates.

We have now obtained new compositions of matter by the reaction of lignin with organic monoisocyanates to produce a product containing urethane linkages connecting the lignin with the isocyanate starting material molecule.

Lignin is a solid material, usually available in powder form, and presents special problems with respect to reaction with an organic isocyanate because of its solid nature.

Lignin is an abundantly available material, and large quantities resulting from wood pulping operations are daily burned or simply discarded into waste streams. In spite of years of intensive research directed toward developing better utilization of this raw material, only a very few commercially useful products have been developed, none of them accounting for any significant volume.

Accordingly, one of the objects of this invention is to produce a reaction product of lignin with an organic monoisocyanate to produce a novel product containing urethane linkages.

Other objects, as well as advantages, of the invention will become apparent from the following description.

The foregoing objects are accomplished by reacting a monoisocyanate with lignin.

Lignin as used herein and in the appended claims encompasses the commonly accepted generic meaning which covers lignin from any source. As is well known, lignin is an extremely complex naturally occurring solid polymer which is available from a number of sources. Lignin has been recovered by pulping wood with organic solvents (Pulp and Paper, vol. 1, Casey, Inter-Science Publishers, Inc., New York (1952), pages 217–218). Lignin has also been recovered from wood by allowing a "brown rot" fungus to feed on the associated cellulose (Scientific American, vol. 199, No. 4, pages 104–113). The last mentioned article also notes that, properly speaking, the term "lignin" refers not to a single compound but to a group of closely related compounds. This fact is also noted in Kirk-Othmer, Encyclopedia of Chemical Technology, vol. 8, page 328. Lignin also varies slightly according to its source, the type of tree or plant, and it appears that the number of methoxy groups and even of the hydroxyl groups varies somewhat according to the source. The only commercially important lignin sources are from commercial wood pulping operations. Wood pulping operations are divided into two broad groups, the alkali processes and the sulfite pulping processes. In the first group there are the sulfate process, the soda process, and the semi-sulfate process. This is the more important source of lignin, and the lignin recovered is in the form of a solid sodium salt or an acid precipitate of the sodium salt, and in this case the sodium has been removed from the hydroxyl groups. Lignin from the sulfite process usually contains sulfonate groups and is available in the form of sodium or calcium salts or in a form where the sulfonic acid groups are free. Sulfite lignin can also be partially or wholly desulfonated by heating with alkalis. Lignin in its natural state in the tree is generally believed to contain four hydroxyl groups per repeating unit, which repeating unit is generally thought to have a unit weight of about 840. However, depending upon the source of the lignin, sometimes one or more of the hydroxyl groups of the original natural compound are blocked or reacted by the various treatments employed to remove lignin from the associated cellulose. Also, by reaction with certain chemicals, some hydroxyl groups are esterified or etherified by reaction with an organic monocarboxylic acid or acid anhydride to form esters, or with an alkyl or aryl halide, such as methyl or ethyl chlorides, or phenyl chloride, or an aralkyl halide such as benzyl chloride, thus replacing a hydrogen of a portion of the hydroxyl groups with the corresponding hydrocarbon group, such as the methyl, ethyl, phenyl or benzyl group, respectively. Also, hydroxyl groups of lignin are converted to methoxy groups by reaction with dimethyl sulfate. Further, esterification of a portion of the hydroxyl groups of lignin is effected by reacting the starting lignin compound with an organic acid or acid anhydride, such as acetic acid, formic acid, propionic acid, etc., and anhydrides of such acids.

In any case, for the practice of the present invention, no matter what the source of the lignin, there must be at least one free hydroxyl group per lignin molecule.

We have found that an alkali lignin (which has all of the hydroxyl groups present in a free, not a salt, form) is a particularly suitable material for forming the products of our invention according to the present process. One suitable commercial product of this type is known as Indulin A, made by the West Virginia Pulp and Paper Company, Charleston, South Carolina. This is a fairly pure product containing more than 98 percent organic material.

In general, lignin recovered in commercial operations designed to effect separation from cellulose and using inorganic chemical reagents, is a lightweight tan to dark brown amorphous powder.

Organic monoisocyanates are generally applicable in the process of the invention. The organic monoisocyanates containing two or more carbon atoms per molecule can be employed. There is no critical upper limit to the number of carbon atoms present in the organic isocyanates employed according to the invention, but the isocyanates employed ordinarily contain up to 25 carbon atoms.

Examples of monoisocyanates useful in the present invention include

Methyl isocyanate
Decyl isocyanate
3-n-butyl-20-isocyanato eicosane
Tert.-butyl isocyanate
Phenyl isocyanate
2-octylphenyl isocyanate
5-tetradecylnaphthalene isocyanate
Cyclohexane isocyanate
1-isocyanato-4-dodecylhexane
1-isocyanato-2-octyl-4-decylhexane
Octadecyl isocyanate Thus, the organic monoisocyanates employed include aliphatic, alicyclic and aromatic monoisocyanates. By the terms aliphatic, alicyclic and aromatic, it is meant to define the character of the radical to which the isocyanate group is attached. Thus, for instance, an aliphatic isocyanate includes n-butyl isocyanate but also includes 3-phenyl-n-butyl isocyanate. Thus, the aliphatic, alicyclic or aromatic group can contain, each of them, aliphatic, alicyclic or aromatic substituents. Hydrocarbon isocyanates form a usually preferred group of monoisocyanates employed in the present invention. In fact, any organic monoisocyanate or monoisothiocyanate of the formula R—NCO or R—NCS, where R is a monovalent organic radical, will function for the purposes of the present invention. Of course, R does not contain functional groups reactive with —NCO or —NCS.

The isocyanates can also be employed in the form of their reaction products with phenols and thiols, which reaction products regenerate the isocyanate in situ on heating. In addition to lignin and isocyanate, varying amounts of plasticizing materials, catalysts, solvents, and emulsifiers can be utilized in the reaction, as will be later more fully discussed.

The following specific examples are illustrative of the invention.

*Example 1*

| | Parts |
|---|---|
| Butyl isocyanate | 59.4 |
| Indulin A (alkali lignin) | 34.0 |
| Dioxane solvent | 360.0 |

The lignin and isocyanate are dissolved in dioxane, agitated for one and one-half hours at reflux (100° C.). The reaction product is precipitated with toluene, filtered, washed with ether and dried at 100° C. The lignin urethane product is a brown solid.

Infrared tests show some unreacted hydroxyl from lignin, but no isocyanate band. Definite urethane bands are detected.

*Example 2*

| | Parts |
|---|---|
| Phenyl isocyanate | 70 |
| Indulin A (alkali lignin) | 34 |
| Dioxane solvent | 370 |

The lignin and isocyanate are dissolved in the dioxane and heated for one and one-half hours at 100° C. The lignin urethane is then precipitated from solution by toluene. It is filtered, washed with ether and dried overnight at 100° C. A brown solid of a thermoplastic nature is the final product.

Infrared tests in Nujol indicate that some hydroxyls of the lignin were not reacted, while all isocyanate reacted. Strong urethane bands are detected.

*Example 3*

Lignin (Indulin A) was powdered to pass 80 mesh screen and was thereafter dried at 50° C. for four hours in a vacuum oven. The lignin was stored in a desiccator for use. 516.70 parts by weight of this lignin was suspended in about 3600 parts by weight of phenyl isocyanate in a flask and was heated for ½ hour at 95° C. with stirring, during which time the reaction of the isocyanate with the lignin was effected. The reaction mixture was then poured into toluene and the solids filtered from the slurry. The solid product was then washed with toluene and the product was then dried for four hours at 50° C. in a vacuum oven. The product recovered was 598.19 parts by weight. Infrared analysis showed the presence of strong urethane bands and the absence of isocyanate bands.

Chemical analysis showed total nitrogen of 1.93 weight percent and the presence of 5.22 milliequivalents —OH groups per gram, as compared with the original lignin of 6.3 milliequivalents —OH per gram.

*Example 4*

Lignin obtained by organic pulping according to the method of Pepper et al., Canadian Journal of Chemistry, 37, 1241–8 (1939), was suspended in finely divided form in the amount of 65.95 parts by weight of lignin in about 3500 parts by weight of phenyl isocyanate in a flask and was heated for ½ hour at 98° C. with stirring, during which time the reaction of the isocyanate with the lignin was effected. The reaction mixture was then poured into toluene and the solids filtered from the slurry. The solid product was then washed with toluene and the product was then dried for four hours at 50° C. in a vacuum oven. The product recovered was 77.61 parts by weight. Infrared analysis showed the presence of strong urethane bands and the absence of isocyanate bands.

Chemical analysis showed total nitrogen of 3.71 weight percent and no detectable amount of —OH groups, as compared with the original lignin of 6.2 milliequivalents —OH per gram. The softening point was determined in the Fisher-Johns melting point apparatus and was found to be 160–170° C.

*Example 5*

Example 4 was repeated except that 40.082 parts by weight of the same lignin and about 440 parts by weight of phenyl isothiocyanate were employed. The product recovered was 44.876 parts by weight after the drying step.

The lignin thiourethane product so produced showed strong thiourethane bands and the absence of isothiocyanate bands. The product was a thermoplastic solid having a softening point (Fisher-Johns) of about 145 to 155° C., being completely melted at 155° C.

In the process of the invention it is within the scope of the process to employ an inert plasticizer such as didecylphthalate. It is also within the scope of the invention to employ a solvent for lignin which is inert to the action of the isocyanate, and examples of such solvents include dimethyl formamide, tetrahydrofuran and dioxane. Indeed, the use of such solvents is one important method of obtaining proper reaction between the solid powdered lignin and the isocyanate.

With respect to the ratio of isocyanate to lignin, it will be understood that it is theoretically possible for each active hydrogen atom to react with one isocyanato group and to choose the proportions stoichiometrically such that no active hydrogen atom is left in the lignin, and no unreacted isocyanato group is left in the final product. This complete reaction of each of these types of reactive groups is seldom achieved in practice, indeed, it is seldom attempted. Complete reaction of the isocyanato groups can be achieved, of course, by using sufficient excess of the lignin. Generally, the ratio of monoisocyanate to lignin is in the range of from 0.05 to 3 gram moles, usually from 0.3 to 2 gram moles per 100 grams of lignin. Of course, the higher amounts represent a great excess of isocyanate, but this excess is easily washed from the product.

When a large excess of a liquid monoisocyanate (or a monoisothiocyanate) is employed, the use of a solvent for the lignin can be dispensed with, since the finely divided lignin forms a slurry in the excess isocyanate. However, more complete reaction in a shorter time is accomplished when a solvent is employed.

Another way to obtain proper reaction between the lignin and the monoisocyanate is to employ a suspension of finely divided lignin in a non-solvent diluent containing the isocyanate reactant. The non-solvent is one which is non-reactive with the isocyanate and thus contains no active hydrogen atoms, such as liquid hydrocarbons or a gaseous hydrocarbon in the liquid state, e.g., butane, toluene, benzene, cyclohexane, propane, cyclopentane, etc.

Temperatures of reaction are generally from about 15 to about 120° C., more usually from about 75 to about 110° C. Isocyanates vary in activity, as is well known, and the temperature to be employed depends to a large degree on this reactivity.

The products of the reaction are lignin urethanes, i.e., a urethane of the general formula

wherein L is the lignin residue, i.e., the lignin molecule absent x number of —OH groups and where the groups $$-O-\underset{\underset{}{\overset{\overset{T}{\|}}{C}}}{}-\underset{\underset{}{\overset{\overset{H}{|}}{N}}}{}-R$$

are at the situs of the absent —OH groups in the lignin molecule, where x is an integer of at least 1, where R is an organic radical containing no active hydrogen atoms reactive with isocyanate groups, and where T is O or S. The upper limit for x cannot be specified since the molecular weight of lignin, and consequently the number of —OH groups per molecule, is not known.

Products of the invention are thermoplastic solids and are useful molding resins. They can be molded under heat and pressure to produce molded shapes, such as toys, etc. The lignin is thus upgraded to a product of greater value than the original lignin, which is well-known to be in such excess supply that large amounts are burned for the fuel value.

Although catalysts are not always employed, they can be used in amounts varying from 0.5 to 2.5 weight percent of the total reactants. Catalysts applicable include n-ethyl morpholine, triethylamine, and triethanolamine. Any other catalysts known in the art for promoting reaction between an organic isocyanate and an active hydrogen-containing compound can be used.

As will be evident to those skilled in the art, various modifications of this invention can be made or followed in the light of the foregoing disclosure and discussion without departing from the spirit and scope of the disclosure or from the scope of the claims.

We claim:

1. A product of the general formula $$L(-O-\underset{\underset{}{\overset{\overset{T}{\|}}{C}}}{}-\underset{\underset{}{\overset{\overset{H}{|}}{N}}}{}-R)_x$$

where L is the lignin molecule absent x number of —OH groups and where the $$-O-\underset{\underset{}{\overset{\overset{T}{\|}}{C}}}{}-\underset{\underset{}{\overset{\overset{H}{|}}{N}}}{}-R$$

groups are attached to the lignin residue at the situs of said absent —OH groups in the lignin molecule, x is an integer of at least 1, R is an organic radical containing no functional groups reactive with isocyanato groups, and T is selected from the group consisting of O and S.

2. A product of claim 1 wherein T is O.
3. A product of claim 1 wherein T is S.
4. A method for preparing a product of the general formula $$L(-O-\underset{\underset{}{\overset{\overset{T}{\|}}{C}}}{}-\underset{\underset{}{\overset{\overset{H}{|}}{N}}}{}-R)_x$$

where L is the lignin molecule absent x number of —OH groups and where the $$-O-\underset{\underset{}{\overset{\overset{T}{\|}}{C}}}{}-\underset{\underset{}{\overset{\overset{H}{|}}{N}}}{}-R$$

groups are attached to the lignin residue at the situs of said absent —OH groups in the lignin molecule, x is an integer of at least 1, R is an organic radical containing no functional groups reactive with isocyanato groups, and T is selected from the group consisting of O and S, which comprises intimately admixing and contacting reactants consisting essentially of lignin and an organic monoisocyanate compound of the formula $$R-N=C=T$$

where R and T have the significance as above stated, and allowing reaction to take place, the ratio of said monoisocyanate compound to said lignin being from 0.05 to 3 gram mols per 100 grams of lignin.

5. A method of claim 4 where T is S.
6. A method of claim 4 where T is O.
7. A method of claim 4 wherein R contains only carbon and hydrogen.
8. A method for preparing a product of the general formula $$L(-O-\underset{\underset{}{\overset{\overset{T}{\|}}{C}}}{}-\underset{\underset{}{\overset{\overset{H}{|}}{N}}}{}-R)_x$$

where L is the lignin molecule absent x number of —OH groups and where the $$-O-\underset{\underset{}{\overset{\overset{T}{\|}}{C}}}{}-\underset{\underset{}{\overset{\overset{H}{|}}{N}}}{}-R$$

groups are attached to the lignin residue at the situs of said absent —OH groups in the lignin molecule, x is an integer of at least 1, R is a hydrocarbon radical containing 1-24 carbon atoms and no functional groups reactive with isocyanato groups, and T is selected from the group consisting of O and S, which comprises intimately admixing and contacting reactants consisting essentially of lignin and an organic monoisocyanate compound of the formula $$R-N=C=T$$

where R and T have the significance as above stated, and allowing reaction to take place, the ratio of said monoisocyanate compound to said lignin being from 0.05 to 3 gram mols per 100 grams of lignin.

9. A product of the general formula $$L(-O-\underset{\underset{}{\overset{\overset{T}{\|}}{C}}}{}-\underset{\underset{}{\overset{\overset{H}{|}}{N}}}{}-R)_x$$

where L is the lignin molecule absent x number of —OH groups and where the $$-O-\underset{\underset{}{\overset{\overset{T}{\|}}{C}}}{}-\underset{\underset{}{\overset{\overset{H}{|}}{N}}}{}-R$$

groups are attached to the lignin residue at the situs of said absent —OH groups in the lignin molecule, x is an integer of at least 1, R is a hydrocarbon radical containing 1-24 carbon atoms and no functional groups reactive with isocyanato groups, and T is selected from the group consisting of O and S.

References Cited in the file of this patent

UNITED STATES PATENTS

| | | |
|---|---|---|
| 2,854,422 | Nichols | Sept. 30, 1958 |
| 2,906,718 | Mills et al. | Sept. 29, 1959 |

FOREIGN PATENTS

| | | |
|---|---|---|
| 763,557 | Germany | June 28, 1954 |